United States Patent [19]
Pariani

[11] Patent Number: 4,549,851
[45] Date of Patent: Oct. 29, 1985

[54] HELICOPTER ROTOR

[75] Inventor: Emilio Pariani, Cardano Al Campo, Italy

[73] Assignee: Costruzioni Aeronautiche Giovanni Agusta S.p.A., Italy

[21] Appl. No.: 606,183

[22] Filed: May 2, 1984

[30] Foreign Application Priority Data

May 5, 1983 [IT] Italy .............................. 67486 A/83

[51] Int. Cl.[4] .............................................. B64C 27/38
[52] U.S. Cl. ................................ 416/140; 416/134 A; 416/141
[58] Field of Search .......... 416/134 A, 138 A, 140 A, 416/140 R, 141

[56] References Cited

U.S. PATENT DOCUMENTS

| 3,778,189 | 12/1973 | Ferris | 416/140 A |
| 3,853,426 | 12/1974 | Rybicki | 416/141 X |
| 3,932,059 | 1/1976 | Rybicki | 416/140 A |
| 4,369,019 | 1/1983 | Lovera et al. | 416/141 X |

Primary Examiner—Everette A. Powell, Jr.
Attorney, Agent, or Firm—Kane, Dalsimer, Kane, Sullivan and Kurucz

[57] ABSTRACT

Helicopter rotor on which the blades are each connected to a center hub plate by means of a U-shaped fork connected to the hub by an elastomer support, the latter supporting a static supporting device for limiting dynamic oscillation on the relative blade in the vertical plane, the said device providing for use of a pin faceted on the side, mounted so as to turn on a taper seat integral with the relative fork and designed to engage with a mating surface integral with the hub.

5 Claims, 4 Drawing Figures

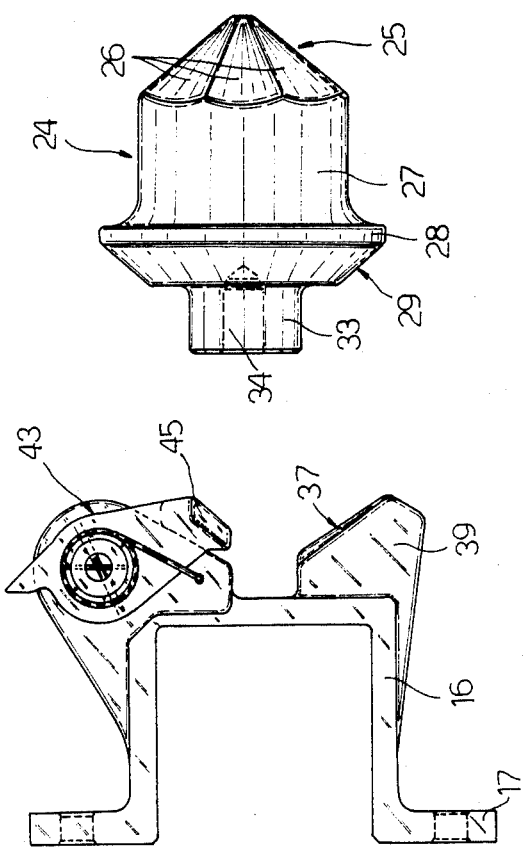
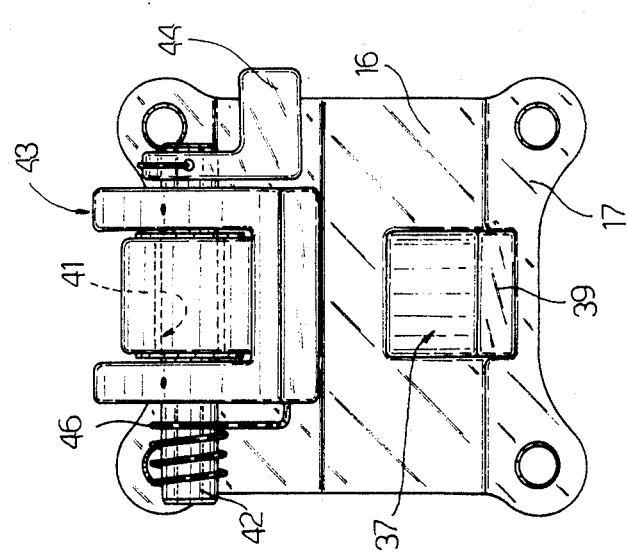

HELICOPTER ROTOR

BACKGROUND OF THE INVENTION

The present invention relates to a helicopter rotor, in particular, a helicopter rotor comprising a center hub, a number of blades, extending radially outwards from the said hub, and a fork for connecting each blade to the hub.

Rotors of the abovementioned type are known to use essentially U-shaped forks extending through respective openings through the hub, each opening being closed outwards by a bridge element enclosed by the relative fork. Between each bridge element and the relative fork, the said rotors are also known to be provided with a set of moving masses, known as pendulums, designed like rocker arms and provided with eccentric masses. The latter determine blade oscillation time in the vertical plane which usually varies according to the rotation speed of the rotor. Using a set of moving pendulums inside each of the said forks results in a highly complex rotor structure which, besides increasing production cost, also reduces reliability and working life.

SUMMARY OF THE INVENTION

The aim of the present invention is to provide a rotor on which the devices limiting blade excursion in the vertical plane are as straightforward as possible and comprise a very small number of weights.

With these aims in view, the present invention relates to a helicopter rotor comprising a center hub and a number of blades extending radially outwards from the said hub and each connected to it by an essentially U-shaped fork having its concave side facing radially outwards; each said fork extending through a relative peripheral opening through the said hub and enclosing a respective bridge element for closing the relative said opening outwards; elastomer connecting and supporting means being inserted between a curved intermediate portion of each said fork and the relative bridge element, and travel limiting means being inserted between each said bridge element and a portion of the relative said fork extending outside the said hub so as to form a static support for the relative blade and a limiter for limiting dynamic oscillation on the blade in an essentially vertical plane, characterised by the fact that, for each said fork, the said travel limiting devices comprise a wall, extending between two arms on the fork outside the said bridge element; a taper seat formed through the said wall and turned facing the said bridge element; a pin fitted so as to turn through the said wall and facing the said bridge element, the said pin being coaxial with the said seat and having a taper supporting surface engaging the said seat and a faceted free end essentially in the shape of a polygonal pyramid; a fixed lower mating piece carried by the said bridge element and designed to engage with one of the said facets on the said pin, and an upper pendulum carried by the said bridge element and moving against the thrust of elastic means from a bottom position contrasting the said faceted end and a top position not interfering with the said pin.

BRIEF DESCRIPTION OF THE DRAWINGS:

Further characteristics and advantages of the present invention will now be described with reference to the attached drawings in which:

FIG. 2 shows an enlarged front view of a first detail in FIG. 1;

FIG. 3 shows a side view of the FIG. 2 detail;

FIG. 4 shows a side view of a second detail in FIG. 1.

DETAILED DESCRIPTION OF THE INVENTION

Figure 1:
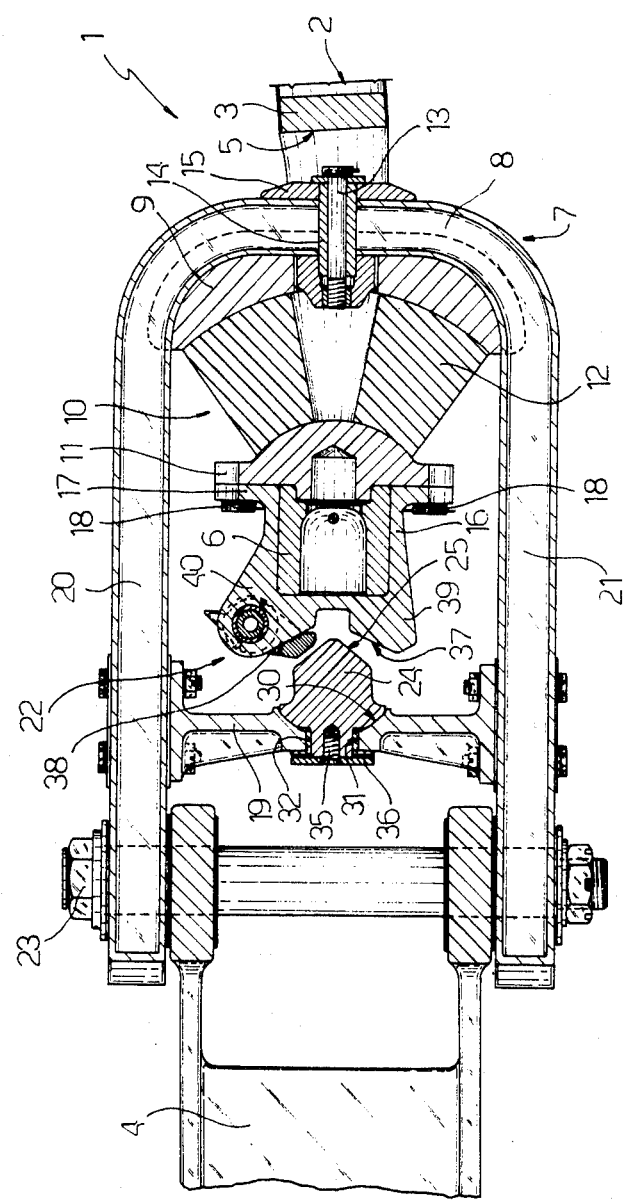
FIG. 1 shows an axial section of a portion of a helicopter rotor according to the present invention.

Number 1 in FIG. 1 indicates a helicopter rotor comprising a center hub (2) consisting of an essentially flat plate (3), preferably made of laminated fibre-reinforced synthetic resin, connected with blades (4) (only one of which is shown partially) extending radially outwards from the plate itself (3).

Plate 3 has a number of openings (5) (only one of which is shown) arranged evenly round the rotation axis of hub 2 and each closed outwards by a respective bridge element (6) extending along the edge of plate 3 and designed to enable connection of a relative blade (4).

Each blade 4 is connected to its relative bridge element (6) by an essentially U-shaped fork (7) arranged on hub 2 with its concave side facing radially outwards and extending through a relative opening (5) so as to enclose its relative bridge element (6).

The concave surface of a curved portion (8) on fork 7 is fitted contacting an inner shoe (9) on an elastomer support (10) comprising an outer shoe (11) and intermediate taper pad (12) made of elastomer reinforced with metal inserts not shown.

Curved portion 8 and shoe 9 are connected by means of a center bolt (13) fitted inside a flanged bush (14) extending through curved portion 8 and shoe 9 and resting on the convex surface of curved portion 8 with a washer (15) inbetween.

Shoe 11 is arranged contacting the inner surface of the relative bridge element (6) to which it is connected by means of a U-bracket (16). The latter is mounted on bridge element 6 with its concave side facing radially inwards and has a flange (17) arranged contacting the edge of shoe 11 to which it is connected by means of screws 18.

Inside the relative bridge element (6), each fork (7) is provided with a wall (19) connecting two opposite arms (20, 21) on fork 7 and supporting, together with bracket 16, a travel limiting device (22) for static support and limiting dynamic oscillation of the relative blade (4) in the vertical plane. The free ends of arms 20 and 21 on each fork 7 are connected by two pins (23) for connecting fork 7 to the relative blade (4).

Device 22 comprises a pin (24) (FIG. 4) having a tip (25) in the shape of a polygonal pyramid with a number of side facets (26). Tip 25 faces bracket 16 and extends from an intermediate cylindrical body (27) the opposite end of which, in relation to tip 25, is fitted with an annular flange (28) limited externally by a truncated-cone surface (29) facing wall 19. The latter has a truncated-cone seat (30) engaging truncated-cone surface 29 and coaxial with bolt 23. On the bottom of seat 30, wall 19 is provided with a through hole (31) in which a cylindrical piece (33) is fitted with a friction free bushing (32) inbetween to enable it to turn, the said cylindrical piece (33) extending axially from flange 28 in the opposite direction to and coaxially with pin 24. Piece 33 has an axial center hole (34) engaged by screw 35 for securing a washer (36) on to the end of piece 33, the said washer (36) being designed to engage axially with a corresponding surface on wall 29 so as to prevent piece 33 from coming out of hole 31 and surface 29 from coming out of seat 30.

The pyramid-shaped tip (25) on pin 24 extends between the sloping surfaces (37, 38) of two ears (39, 40) extending from bracket 16 towards wall 19. In more detail, ear 39, arranged below pin 24, acts as a mating piece whereby, with surface 37 contacting one of facets 26, blade 4 is stopped in a preset position when the rotor (1) is idle (FIGS. 2 and 3).

Ear 40 has a through hole (41) engaged by a turning pin (42), supporting a rocker arm or pendulum (43), and by an eccentric mass (44). End 45 of rocker arm 43 is held downwards in the direction of tip 25 on pin 24 by a spring (46) and rocker arm 43 designed to move against the force exerted by spring 46 so as to move end 45 out of the path of pin 24.

In use, with the rotor idle, one of side facets 26 on tip 25 of pin 24 rests on surface 37 of ear 39 so as to support the relative blade (4) in a given static position. The strain exerted on pin 24 by contact with surface 37 is released entirely on to seat 30 without affecting hole 31 or piece 33. Thus, the rotary connection between piece 33 and hole 31 remains perfectly operative, even after an extremely long operating time, thus enabling pin 24 to turn correctly round its axis so that, when the rotor stops, the angular position of pin 24 can adapt to ensure surface 37 and tip 25 always contact along one of facets 26 and never along one of the edges on tip 25. As for pendulum 43, its position is such that, when the rotor is started or in the event of gales with the rotor idle, blade 4 is prevented from moving up too far. When the rotor reaches a given speed, the eccentric masses on pendulum 43 move the latter upwards by centrifugal force so as to enable the relative blade to position itself properly in the vertical plane.

I claim:

1. A helicopter rotor of the fully articulated type comprising a central hub adapted to be mounted for rotation about an axis;

at least one blade projecting substantially radially from said hub;

means connecting said blade to said hub for fully articulated motion relative to said hub;

stop means interposed between said blade and said hub to limit to predetermined extents the articulated movements of said blade relative to said hub in static conditions and in dynamic conditions respectively and in a plane substantially parallel to the axis of rotation of the hub;

said connecting means comprising a bridge element extending along a periphery of the hub and rigid therewith, a U-shaped fork extending about said bridge element and outwards therefrom in a substantially radial direction, coupling means connecting an open outer end of said fork to an inner end of said blade, and an elastomeric bearing interposed between said fork and said bridge element for fully articulated motion of said fork relative to said bridge;

said stop means comprising a pin having an axis extending in a substantially radial direction relative to said hub and arranged outside said bridge element, said pin being supported by said fork for rotation about its axis and having a faceted free end portion facing said bridge element and substantially shaped as a polygonal pyramid, a fixed lower stop member supported by said bridge element and positioned thereon to engage said faceted free end portion of said pin when said blade drops downwardly to a selected first angle, and a centrifugally responsive upper stop member supported by said bridge element and mounted for movement relative thereto between a first position in which said upper stop member engages said faceted free end portion of said pin when said blade moves upwardly to a selected second angle, and a second position in which said upper stop member is arranged outside a space region swept by said faceted free end portion during movement of said blade upwards.

2. A rotor as claimed in claim 1, wherein said fork comprises an intermediate curved portion, and two arms extending from opposite ends of said curved portion;

said elastomeric bearing being arranged between said bridge element and said intermediate curved portion, and a wall connecting said two arms to one another outside said bridge element;

said pin being rotary supported by said wall.

3. A rotor as claimed in claim 2, wherein a tapered seat facing said bridge element is provided on said wall, and a tapered surface facing away from said faceted free end portion being provided on said pin coaxially with the axis of rotation of said pin and mating said tapered seat.

4. A rotor as claimed in claim 3, wherein said pin comprises an annular flange, a surface of which consists in said tapered surface, and an extension extending axially from said tapered surface and away from said faceted free end portion;

said wall being provided with a through hole coaxial with said tapered seat, said extension rotary engaging said through hole, and clamping means engaging said extension and said wall to hold said tapered surface in mating contact with said tapered seat.

5. A rotor as claimed in claim 1, wherein said elastomeric bearing has an outer race arranged in contact with an inner race of said bridge element, and wherein a U-shaped bracket is provided embracing said bridge element and connected to said outer race to connect the same to said bridge elements, and said stop means being carried by said bracket.

* * * * *